(12) United States Patent
Drury

(10) Patent No.: US 9,216,650 B2
(45) Date of Patent: Dec. 22, 2015

(54) THIN GAUGE WITH SELF-EMITTING DISPLAY FOR HIDDEN POINTER

(75) Inventor: Robert L. Drury, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 458 days.

(21) Appl. No.: 13/387,824

(22) PCT Filed: Jul. 28, 2010

(86) PCT No.: PCT/US2010/043494
§ 371 (c)(1),
(2), (4) Date: Jan. 30, 2012

(87) PCT Pub. No.: WO2011/014539
PCT Pub. Date: Feb. 3, 2011

(65) Prior Publication Data
US 2012/0126966 A1 May 24, 2012

Related U.S. Application Data

(60) Provisional application No. 61/229,081, filed on Jul. 28, 2009.

(51) Int. Cl.
*B60K 37/02* (2006.01)
*B60K 35/00* (2006.01)
*G01P 1/08* (2006.01)

(52) U.S. Cl.
CPC .................. *B60K 35/00* (2013.01); *B60K 37/02* (2013.01); *B60K 2350/1064* (2013.01); *B60K 2350/1072* (2013.01); *B60K 2350/203* (2013.01); *B60K 2350/408* (2013.01); *G01P 1/08* (2013.01)

(58) Field of Classification Search
CPC .................. B60K 37/02; B60K 35/00; B60K 2350/1064; B60K 2350/1072; B60K 2350/203; B01D 11/28; B01D 13/22; B01D 13/265; B01P 1/08; Y10S 116/06; Y10S 116/36
USPC .......................... 340/461, 462, 525, 815.55; 116/186–288, 305, 328; 362/23.01, 362/489
See application file for complete search history.

(56) References Cited

U.S. PATENT DOCUMENTS

| 5,920,256 A * | 7/1999 | Toffolo et al. ................. 340/461 |
| 7,347,160 B2 * | 3/2008 | Honma et al. ................. 116/288 |
| 7,482,915 B2 * | 1/2009 | Sumiya et al. ................. 340/461 |
| 7,571,696 B1 * | 8/2009 | Fong et al. ..................... 116/286 |
| 2006/0012971 A1 * | 1/2006 | Fong et al. ...................... 362/23 |
| 2011/0193694 A1 * | 8/2011 | Bowden et al. ................ 340/438 |

FOREIGN PATENT DOCUMENTS

| DE | 102005015178 A1 | 10/2006 |
| WO | 03016830 A1 | 2/2003 |
| WO | 2008063633 A2 | 5/2008 |

* cited by examiner

Primary Examiner — Fekadeselassie Girma
Assistant Examiner — Benyam Haile

(57) ABSTRACT

An exemplary vehicle instrument panel includes gauges for communicating various vehicle operating parameters and conditions that include self-emitting displays. The exemplary vehicle gauge includes the display that is self-emitting. The exemplary display is a self-emitting programmable display that can be operated and programmed to electronically generate text, symbols and graphics. Moreover, all of the display area making up the gauge face can be programmed and actuated to display electronically generated images to provide desired information and data.

20 Claims, 4 Drawing Sheets

THIN GAUGE WITH SELF-EMITTING DISPLAY FOR HIDDEN POINTER

CROSS REFERENCE TO RELATED APPLICATION

This application is a §371 of international application PCT/US2010/043494, which was filed on Jul. 28, 2010; this application also claims the priority to U.S. Provisional Application No. 61/229,081 which was filed on Jul. 28, 2009.

BACKGROUND

This disclosure generally relates to an illuminated gauge assembly. More particularly, this disclosure relates to an illuminated gauge assembly with a self-emitting display.

An instrument cluster for a vehicle includes several gauge assemblies to communicate various vehicle operating parameters such as vehicle speed and engine temperature. Each of the gauge assemblies are illuminated such that an operator can read the gauge in low light conditions. Moreover, combinations of display technologies such as liquid crystal displays (LCD) provide the ability to display much more information than a corresponding analog gauge. However analog dial gauges are still preferred for the primary vehicle operating parameters such as speed. Therefore, a combination of analog with display technologies such as LCDs are commonly combined. However, such combinations require backlighting, diffusers, and specifically configured housings that complicate designs. Light guides and specially designed housings increase cost and limit design alternatives for the gauge assembly. Additionally, gauges that include a hidden pointer require complex linkages to accommodate light guides and special housing configurations required to provide the desired gauge illumination.

SUMMARY

A disclosed vehicle instrument panel includes gauges for communicating various vehicle operating parameters and conditions that include self-emitting displays. The example display comprises a self-emitting programmable display that can be operated and programmed to electronically generate text, symbols and graphics. Moreover, all of the display area can be programmed and actuated to display electronically generated images to provide desired information and data.

The display includes graphical symbols that are indicative of vehicle operating parameters and can be printed onto the display or generated electronically by the display. A transparent portion of the display is arranged radially inward of the symbols and provides for viewing of an illuminated pointer tip. The pointer tip is part of a pointer supported for rotation behind the display. The display includes a center portion disposed within the space outlined by the transparent ring that can be programmed to display viewable symbols and information in a desired format.

These and other features disclosed herein can be best understood from the following specification and drawings, the following of which is a brief description.

DETAILED DESCRIPTION

Figure 1:
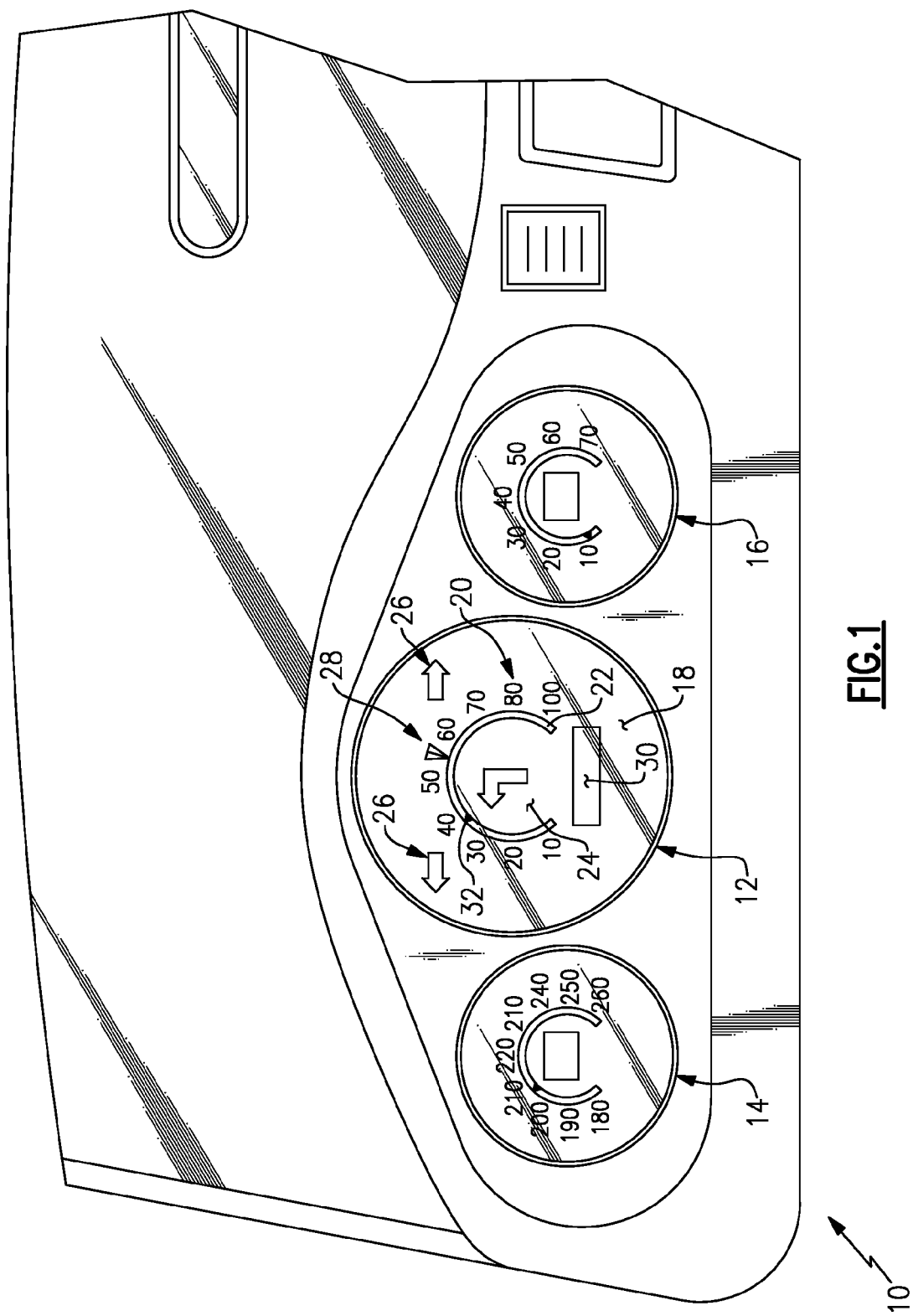
FIG. 1 is a front view of an example vehicle instrument panel assembly.

Referring to FIG. 1, a vehicle instrument panel 10 includes gauges 12, 14 and 16 for communicating various vehicle operating parameters and conditions. Each of the example gauges 12, 14 and 16 include a self-emitting display 18. In this disclosure the term self-emitting is utilized to refer to the display 18 that is illuminatable to provide for low light visibility without external light sources, back lighting or light guides. Accordingly, the example gauges 12, 14, and 16 do not require additional light sources to illuminate the display 18. Instead, illumination is provided by the self-emitting display 18.

Figure 3:
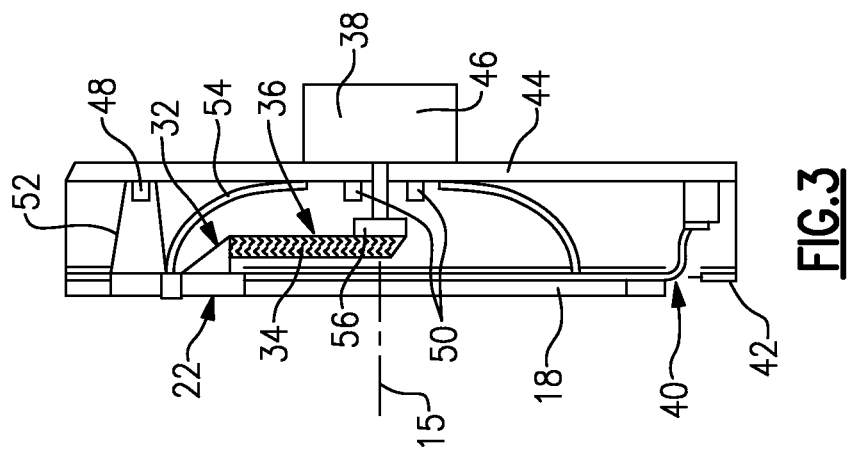
FIG. 3 is a cross-sectional view of the example gauge assembly.
Figure 2:
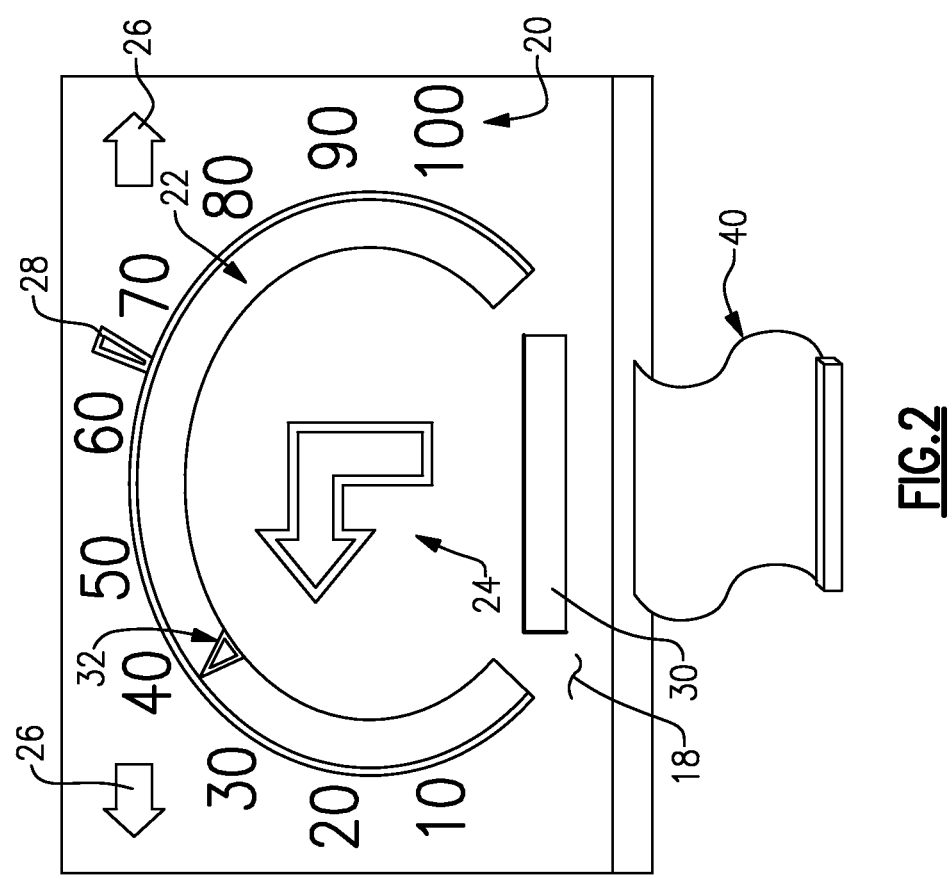
FIG. 2 is a front view of an example gauge assembly.
Figure 4:
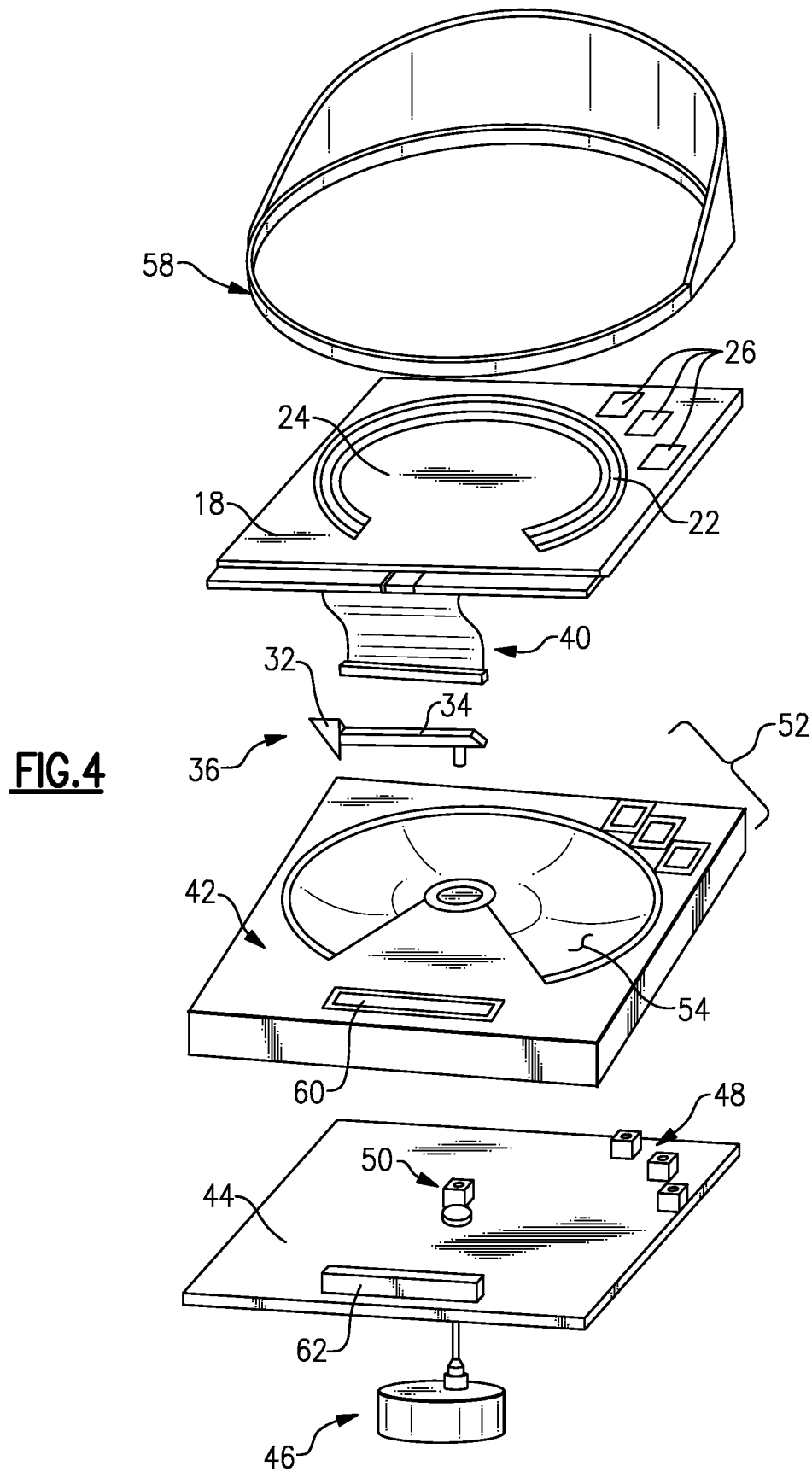
FIG. 4 is an exploded view of the example gauge assembly.

Referring to FIGS. 2-4, the example vehicle gauge 12 includes the display 18 that is self-emitting. In the disclosed example, the display 18 comprises an organic light emitting diode (OLED) that can be programmed to display various electronically generated text, symbols and graphics. Moreover, all of the display 18 can be programmed and actuated to display electronically generated images to provide desired information and data.

The display 18 includes graphical symbols 20 that are indicative of vehicle speed in miles per hour. As appreciated, other vehicle operating parameters such as engine speed and temperature could also be indicated by the graphical symbols 20. The example graphical symbols 20 are ink pass numbers applied directly to the face of the display 18 and are arranged radially about an axis 15. The symbols 20 are illuminated by the display 18. Additionally, because the entire display 18 is formed of the OLED display, the graphical symbols 20 could be generated electronically to simplify manufacture and provide optional display parameters. For example, vehicle speed could be switched from being displayed in miles per hour as is shown, to being displayed in kilometers per hour by changing the electronically displayed symbols. The use of the OLED display 18 may also be utilized to generate preferred styles of symbol font, color or size.

As should be appreciated, although an OLED display 18 is disclosed by way of this description, other programmable displays that can provide self-emitting capabilities are within the contemplation of this invention.

A ring shaped transparent portion 22 of the display 18 is arranged radially inward of the symbols 20 and provides for viewing of an illuminated pointer tip 32. The pointer tip 32 is part of a pointer 36 including a body portion 34 supported for rotation behind the display 18 about the axis 15 by a gauge movement 46. The example gauge movement 46 is a stepper motor, however, other movement devices as are known fall within the contemplation of this disclosure. The example ring shaped transparent portion 22 provides for viewing of the pointer tip 32 rotating below the display 18. The pointer tip 32 points to a portion of the symbols 20 to communicate a current condition of a vehicle operating parameter.

The example display 18 includes a graphically generated pointer image 28 that indicates a current cruise control setting. The image 28 is generated by the display 18 and disposed within the ring of the symbols 20. The image 28 illustrates the capability of generating images throughout the entire display 18 to communicate information to a vehicle operator. Additional electronically generated images and text can be displayed anywhere on the display 18 to communicate any desired information. Further, the display 18 includes a text box 30 where electronically generated text or symbols such as vehicle odometer, instant gas mileage or any other desired information can be displayed.

The display 18 includes a center portion 24 disposed within the space outlined by the transparent ring 22. The center portion 24 is a portion of the display 18 that can be programmed to display viewable symbols and information in a desired format. The viewable symbols are produced electronically and therefore can communicate many different types of information as desired. In this example the center portion 24 is displaying a turn arrow that could be utilized by an on-board navigation system to communicate directional information. Moreover, the center portion 24 may also communicate information indicative of vehicle condition, trip data along with warnings such as door ajar notifications.

The example display 18 is supported on a housing 42 that defines a cavity 54 within which the pointer 36 rotates. A circuit board 44 is mounted to a back side of the housing 42. The circuit board 44 includes a light source 50 for illuminating the pointer 36 and light sources 48 for illuminating a transparent display area 26 of the display 18. The example transparent display area 26 defines turn signal tell tales that are selectively illuminated by the light sources 48. As appreciated, although a turn signal tell tale is illustrated, other desired features such as warning symbols and/or bar graphs to illustrate fuel level or temperature could also be implemented and are within the contemplation of this disclosure. The example light sources 50, 48 are light emitting diodes (LED), but any known light source could be utilized.

The pointer 36 includes the body portion 34 that includes reflecting surfaces 56 that direct light form the light sources 50 through the pointer body 34 to the pointer tip 32. Only the pointer tip 32 is viewable through the transparent ring 22 to provide the desired aesthetic appearance. Moreover, because only the pointer tip 32 is viewable, the center portion 24 becomes available to display desired graphical information. This provides more viewable area in the gauge 12 to communicate information to the vehicle operator, while maintaining the desired analog speedometer.

The housing 42 includes a slot 60 for the display interconnect 40 that is attached to the connector 62 on the circuit board 44. The interconnect 40 provides the electrical communication to the display 18 to provide instructions and electrical power to both illuminate the display 18 and to generate the desired electronic images and text. A shroud 58 is mounted over the display to shield the display from ambient light and to define an outer perimeter of the display 18.

Because the display 18 is self-emitting, no additional backlighting or light guide is required for illuminating the display 18. Accordingly, the example gauge 12 can be fabricated with relatively simple components to provide a reduced thickness gauge assembly in contrast with complex configurations required by gauges requiring backlighting. Moreover, the example movement 46 can directly support the pointer 36 for rotation about the axis 15 instead of requiring relatively complex mechanisms to support movement of the pointer tip 32 about the center display portion 24.

Figure 6:
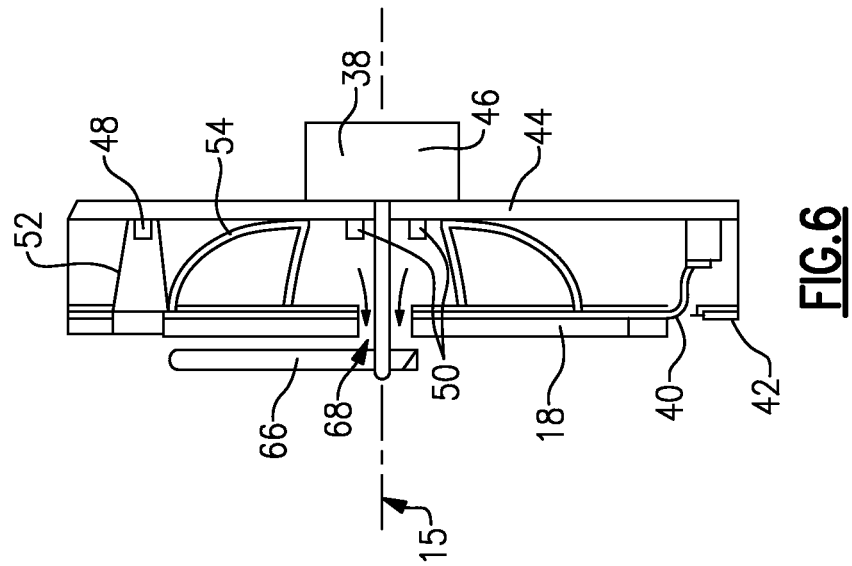
FIG. 6 is a side view of the example gauge assembly shown in FIG. 5.
Figure 5:
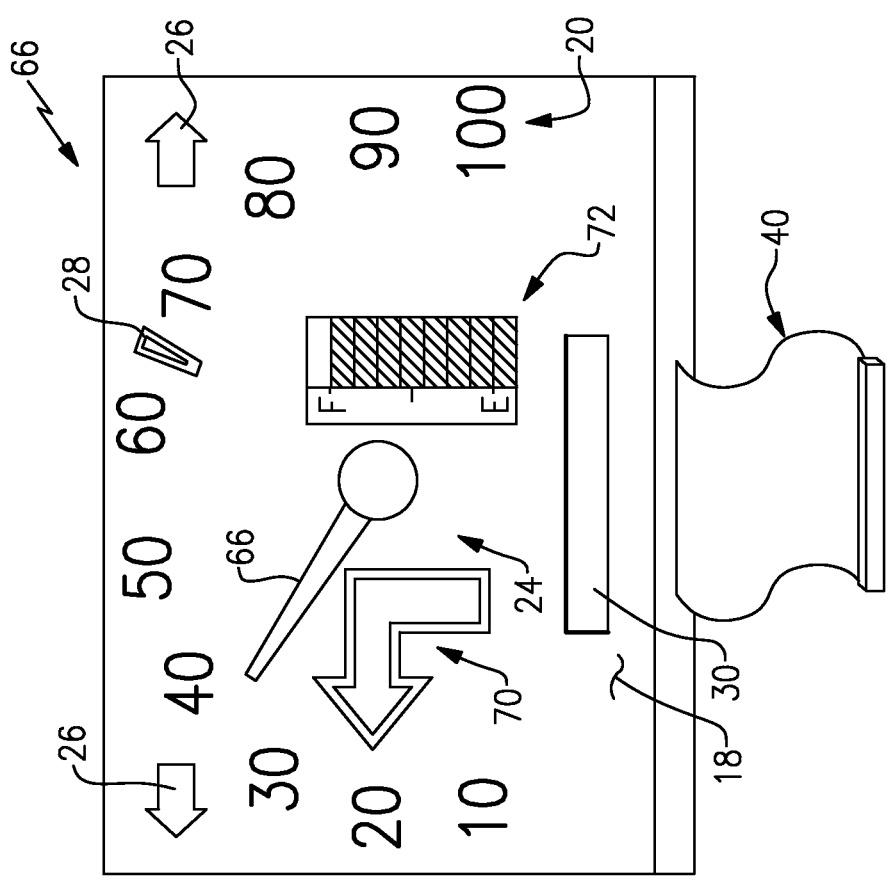
FIG. 5 is a front view of another example gauge assembly.

Referring to FIGS. 5 and 6, another example gauge assembly 64 includes a pointer 66 that rotates in front of the display 18. The pointer 66 extends through an opening 68 in the display 18 and rotates about the axis 15 to indicate the vehicle operating parameter represented by the graphical display 20. In this example, the display includes an electronically generated graphic representing a direction 70 from a navigation system. Additionally, a fuel level bar graph 72 is generated electronically by the display 18. The bar graph 72 is illustrated disposed in the center portion 24 of the display 18, but may be positioned anywhere desired. The pointer 66 still rotates about the axis 15 and is lit by LEDs 50. The LEDs 50 directed light upward for illuminating the pointer 66. The pointer 66 may also be illuminated by the proximity to the self-emitting display 18.

Accordingly, the disclosed self-emitting display 18 provides additional freedom to design aesthetically pleasing gauges with different combinations of display and analog features. Because the display 18 is self-emitting, no additional backlighting or light guide is required for illuminating the display 18. Accordingly, the example gauges 12, 66 can be fabricated with relatively simple components to provide a reduced thickness gauge assembly in contrast with complex configurations required by gauges requiring backlighting. Moreover, the example movement 46 can directly support the pointer 36 for rotation about the axis 15 instead of requiring relatively complex mechanisms to support movement of the pointer tip 32 about the center display portion 24.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A vehicle gauge assembly, comprising:
    a gauge face having an electronic display, said electronic display being a self-illuminatable electronic display configured for electronically generating graphical symbols indicative of a vehicle operating condition, said electronic display having a permanent transparent portion there through; and
    a pointer movable relative to said electronic display for indicating a current vehicle operating condition by pointing to said graphical symbols electronically generated by said electronic display, only a portion of the pointer being viewable through the permanent transparent portion;
    said electronic display being a single display configured for electronically generating the graphical symbols radially inside and radially outside of said permanent transparent portion.

2. The vehicle gauge assembly according to claim 1, wherein said permanent transparent portion is a first transparent portion.

3. The vehicle gauge assembly according to claim 2, wherein said first transparent portion is formed radially inward of the graphical symbols.

4. The vehicle gauge assembly according to claim 3, wherein said pointer includes a tip portion, and the assembly further comprises a light source different from said electronic display for illuminating said tip portion of said pointer.

5. The vehicle gauge assembly according to claim 1, wherein at least a portion of said electronic display is viewable outside of said graphical symbols.

6. The vehicle gauge assembly according to claim 1, wherein said electronic display includes a transparent display area, and the assembly further comprises a light source different from said electronic display for illuminating said transparent display area.

7. The vehicle gauge assembly according to claim 1, further comprising a housing supporting said electronic display, said housing being formed with a cavity having said pointer disposed therein.

8. The vehicle gauge assembly according to claim 7, further comprising a circuit board mounted to said housing.

9. The vehicle gauge assembly according to claim 8, further comprising an actuator mounted to said circuit board for moving said pointer.

10. The vehicle gauge assembly according to claim 1, wherein said self-illuminating electronic display comprises an organic light emitting display.

11. A vehicle instrument panel assembly, comprising:
a gauge including a self-emitting electronic display configured for electronically generating graphical symbols indicative of a vehicle operating parameter; and
a pointer movable relative to said electronic display for indicating a current vehicle operating parameter by pointing to said graphical symbols electronically generated by said electronic display;
said electronic display formed with a permanent transparent portion enabling only a portion of said pointer to be viewed through said permanent transparent portion, said electronic display being a single display configured for electronically generating the graphical symbols radially inside and radially outside of said permanent transparent portion.

12. The vehicle instrument panel assembly according to claim 11, wherein said permanent transparent portion is a ring disposed about a center area of said electronic display.

13. The vehicle instrument panel assembly according to claim 12, wherein said pointer includes an illuminated tip portion viewable through said ring.

14. The vehicle instrument panel assembly according to claim 12, wherein said center area is programmable to display information indicative of vehicle operation.

15. The vehicle instrument panel assembly according to claim 12, wherein a portion of the gauge disposed radially outside of said electronic display is self-emitting.

16. The vehicle instrument panel assembly according to claim 11, wherein said electronic display is configured to display an electronic image.

17. The vehicle instrument panel assembly according to claim 11, wherein said electronic display comprises at least one device selected from the group consisting of an organic light emitting diode and a liquid crystal display.

18. The vehicle instrument panel assembly according to claim 11, further comprising a housing supporting said electronic display and a circuit board mounted to said housing.

19. The vehicle instrument panel assembly according to claim 18, wherein said electronic display includes a transparent display portion and said circuit board includes a light source corresponding to said transparent display portion for selectively illuminating said transparent display portion.

20. The vehicle instrument panel assembly according to claim 11, wherein said electronic display has a face and said graphical symbols are disposed on said face of said electronic display.

* * * * *